(12) United States Patent
Nesanelis et al.

(10) Patent No.: US 11,087,256 B2
(45) Date of Patent: Aug. 10, 2021

(54) GRAPHICAL USER INTERFACE FOR DISCOVERING CONSUMPTION OF SERVICES

(71) Applicant: ServiceNow, Inc., Santa Clara, CA (US)

(72) Inventors: Alex Nesanelis, Sarasota, FL (US); Shankar Janardhan Kattamanchi, Hyderabad (IN); Samiya Ali, San Jose, CA (US); Krishna Chaitanya Durgasi, Andhra Pradesh (IN); Yogesh Deepak Devatraj, Hyderabad (IN); Sharath Chandra Lagisetty, Hyderabad (IN); Nitin Lahanu Hase, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 893 days.

(21) Appl. No.: 15/651,977

(22) Filed: Jul. 17, 2017

(65) Prior Publication Data
US 2018/0322429 A1    Nov. 8, 2018

(30) Foreign Application Priority Data
May 5, 2017 (IN) .............................. 201711015991

(51) Int. Cl.
*G06Q 10/06* (2012.01)
*H04L 12/24* (2006.01)
(Continued)

(52) U.S. Cl.
CPC ..... *G06Q 10/06315* (2013.01); *G06F 3/0482* (2013.01); *G06F 40/177* (2020.01); *G06T 11/206* (2013.01); *H04L 41/0803* (2013.01); *H04L 41/22* (2013.01); *H04L 67/2833* (2013.01); *G06T 2200/24* (2013.01); *H04L 67/20* (2013.01)

(58) Field of Classification Search
CPC ............ H04L 29/08099; H04L 43/065; G06Q 20/145
USPC ....................................................... 705/7.25
See application file for complete search history.

(56) References Cited

U.S. PATENT DOCUMENTS 5,699,528 A * 12/1997 Hogan .................. G06Q 20/04
  705/40
6,321,229 B1   11/2001 Goldman
(Continued)

*Primary Examiner* — Johnna R Loftis
(74) *Attorney, Agent, or Firm* — Fletcher Yoder PC

(57) ABSTRACT

An example embodiment may involve receiving, by a server device and from a client device, a request for a graphical representation of consumption trends of a set of application services. The server device may obtain information regarding computing devices in a managed network by way of a proxy server application disposed within the managed network, and the services may be provided and consumed by units of the managed network. The consumption trends may be based at least in part on the information regarding the computing devices. The embodiment may further involve obtaining information regarding the consumption trends for the services, and transmitting, by the server device and to the client device, a representation of a graphical user interface that represents a total price paid for the services consumed over a period of time, and respective prices paid for each service of the services consumed over the period of time.

20 Claims, 12 Drawing Sheets

(51) Int. Cl.
  *H04L 29/08* (2006.01)
  *G06T 11/20* (2006.01)
  *G06F 3/0482* (2013.01)
  *G06F 40/177* (2020.01)

(56) References Cited

U.S. PATENT DOCUMENTS

| | | | |
|---|---|---|---|
| 6,526,392 B1 * | 2/2003 | Dietrich | G06Q 30/0283 |
| | | | 705/400 |
| 6,609,122 B1 | 8/2003 | Ensor | |
| 6,816,898 B1 | 11/2004 | Scarpelli | |
| 6,968,323 B1 * | 11/2005 | Bansal | G06Q 10/06 |
| | | | 705/80 |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,657,471 B1 * | 2/2010 | Sankaran | G06Q 40/12 |
| | | | 705/35 |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,235 B1 * | 6/2011 | Capelli | G06Q 10/10 |
| | | | 705/35 |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,373,081 B2 * | 8/2019 | Crawford | G06Q 10/0631 |
| 10,453,012 B2 * | 10/2019 | Watkins | H04W 48/18 |
| 2005/0220280 A1 * | 10/2005 | Steinberg | H04M 15/00 |
| | | | 379/93.12 |
| 2007/0206741 A1 * | 9/2007 | Tiliks | H04M 3/2281 |
| | | | 379/106.02 |
| 2009/0055299 A1 * | 2/2009 | King | G06Q 30/04 |
| | | | 705/34 |
| 2010/0110077 A1 * | 5/2010 | Grossman | G06Q 10/06 |
| | | | 345/440 |
| 2011/0019566 A1 * | 1/2011 | Leemet | H04L 12/14 |
| | | | 370/252 |
| 2012/0226808 A1 * | 9/2012 | Morgan | G06F 9/5072 |
| | | | 709/226 |
| 2012/0271671 A1 * | 10/2012 | Zaloom | G06Q 10/0639 |
| | | | 705/7.11 |
| 2014/0229901 A1 * | 8/2014 | Chand | G06F 16/904 |
| | | | 715/854 |

* cited by examiner

| | | | |
|---|---|---|---|
| SHOW BACK STATEMENTS | | UNIT STATEMENT | GENERATE |

☰ SHOW BACK RUN LOGS

| FISCAL PERIOD | STATUS | STATEMENT STATUS | UPDATED |
|---|---|---|---|
| FY17: JAN | GENERATED | NOT PUBLISHED | 2017-01-29 07:12:29 |
| FY17: JUN | NOT GENERATED | NOT PUBLISHED | 2017-01-29 07:12:29 |
| FY17: NOV | NOT GENERATED | NOT PUBLISHED | 2017-01-29 07:12:29 |
| FY17: JUL | NOT GENERATED | NOT PUBLISHED | 2017-01-29 07:12:29 |
| FY17: DEC | NOT GENERATED | NOT PUBLISHED | 2017-01-29 07:12:29 |
| FY17: SEP | NOT GENERATED | NOT PUBLISHED | 2017-01-29 07:12:29 |

< >  ROWS 1 – 7 OF 7

FIG. 8

| | | | | | | | | | |
|---|---|---|---|---|---|---|---|---|---|
| 900 ⎯ | | | | | | | 602 ⎯ | | 604 ⎯ |
| | | | | | | | USER ACCOUNT | | SETTINGS |
| 906 ⎯ | | 910 ⎯ | | | | | | | |
| MY CHARGE ITEMS | | CONSUMABLES DETAILS | | | | | CANCEL | | SET PRICE |
| 908 ⎯ CONSUMABLES RATECARD UPDATE ON DATE | | EFFECTIVE START DATE FY17: FEB | | | CHARGING TYPE PERCENTAGE BASED | | | CHARGING POLICY CATALOG ITEM LEVEL | |
| FACILITIES CHARGES RATECARD UPDATE ON DATE | NAME | UNIT TYPE | AVG. UNIT COST | UNIT PRICE | QUANTITY | TOTAL COST | PRICE ADJUSTMENT | TOTAL PRICE | COST RECOVERY TARGET | YTD COST RECOVERY |
| HR FACILITIES RATECARD UPDATE ON DATE | ∨ CONSUMABLES | | | | | $11,999.85 | | $11,999.85 | | |
| | ∨ TABLETS | | | | | $11,999.85 | | $11,999.85 | | |
| SERVER SERVICES RATECARD UPDATE ON DATE | TABLET TYPE 1 | | | | | $9,000.00 | 0 | $9,000.00 | | |
| | TABLET TYPE 2 | | | | | $2,999.85 | 0 | $9,000.00 | | |
| STORAGE SERVICES RATECARD UPDATE ON DATE | | | | | | | | | | |
| WAN RATECARD UPDATE ON DATE | | | | | | | | | | |

FIG. 9

GRAPHICAL USER INTERFACE FOR DISCOVERING CONSUMPTION OF SERVICES

CROSS-REFERENCE TO RELATED APPLICATION

This application claims priority to and the benefit of Indian Patent Application No. 201711015991, entitled "GRAPHICAL USER INTERFACE FOR DISCOVERING CONSUMPTION OF SERVICES", filed May 5, 2017, which is herein incorporated by reference in its entirety.

BACKGROUND

An enterprise may involve many interrelated units, such as human resources (HR), supply chain, information technology (IT), legal, and finance as well as custom units specific to the enterprise. These units may provide various services that are consumed by other units. For example, IT may provide and set up new computing devices for members of other units in the enterprise. Similarly, other units may provide services and consumables (physical goods) that are consumed by units in the enterprise. As a result, numerous goods and services are transferred and consumed across units in the enterprise. Without adequate tracking of the production and consumption of these goods and services, units within the enterprise may fail to manage and ensure proper compensation is provided for each service.

SUMMARY

As noted above, units in an enterprise may provide services to other units within the enterprise. For instance, HR may provide services involving managing employees, organizing benefits for employees and setting up recruiting events that benefit other units in the enterprise. Similarly, other units may provide other types of services that are consumed within the enterprise. For example, the finance unit may provide financial services and reports for other units while the IT unit may sets up and manages technologies used by other units in the enterprise. In other examples, a service may represent a consumable good, an act provided by a member or members of the providing unit, facilities, or other possible resources that a unit associated with the enterprise may provide.

With units producing and consuming various services across the enterprise, it may be difficult for each unit to adequately monitor its production and consumption of services. For instance, a unit may fail to ensure that the unit receives adequate compensation for all services provided to other units of the enterprise. The unit might not have the tools available to monitor all transactions for each service the unit provides. In some cases, a unit may provide a service that is difficult to measure and assign an appropriate value to receive in return.

Further, units of the enterprise may also not have the ability to measure the right levels of each service to provide to others. For example, a unit may fail to measure the amount of a service it provided to units during one or more prior periods of time making it difficult to predict future consumption trends for the service. As a result, the unit may often fail to predict future demand for its services leading the unit to overprovide or underprovide the services in the future.

Accordingly, a first example embodiment may involve receiving, by a server device disposed within a remote network management platform and from a client device, a request for a graphical representation of consumption trends of a set of services. The server device may be configured to obtain information regarding computing devices in a managed network by way of a proxy server application disposed within the managed network and the set of services may be provided and consumed by units of the managed network. In addition, the consumption trends may be based at least in part on the information regarding the computing devices. The first example embodiment may also involve obtaining, by the server device, information regarding the consumption trends, and transmitting, by the server device to the client device, a representation of a graphical user interface. In particular, the graphical user interface may represent a total price paid for the set of services consumed over a period of time, and respective prices paid for each service of the set of services consumed over the period of time.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include a proxy server application disposed within a managed network. The managed network may include computing devices configured to execute a set of applications that provide a plurality of capabilities. The system may further include one or more server devices disposed within a remote network management platform. The remote network management platform may manage the managed network, and the one or more server devices may be configured to obtain information regarding the computing devices by way of the proxy server application. The one or more server devices may be configured to perform operations in accordance with the first example embodiment.

In a fifth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts a graphical interface representing statements for consumption of services, in accordance with example embodiments.

FIG. 9 depicts a graphical interface representing consumption information for a consumer of a service, in accordance with example embodiments.

DETAILED DESCRIPTION

Figure 1:
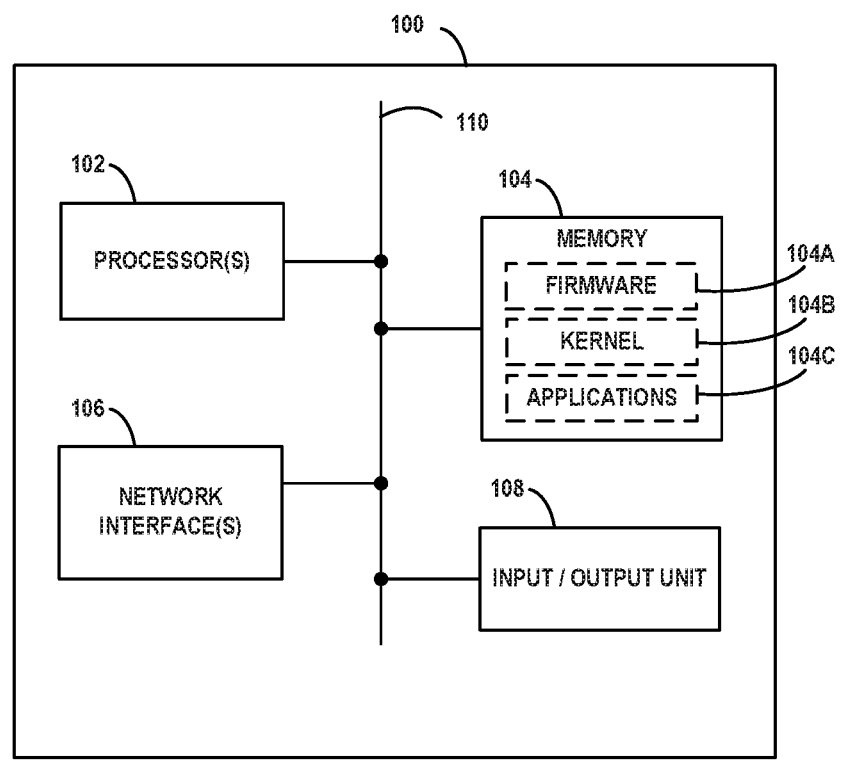
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
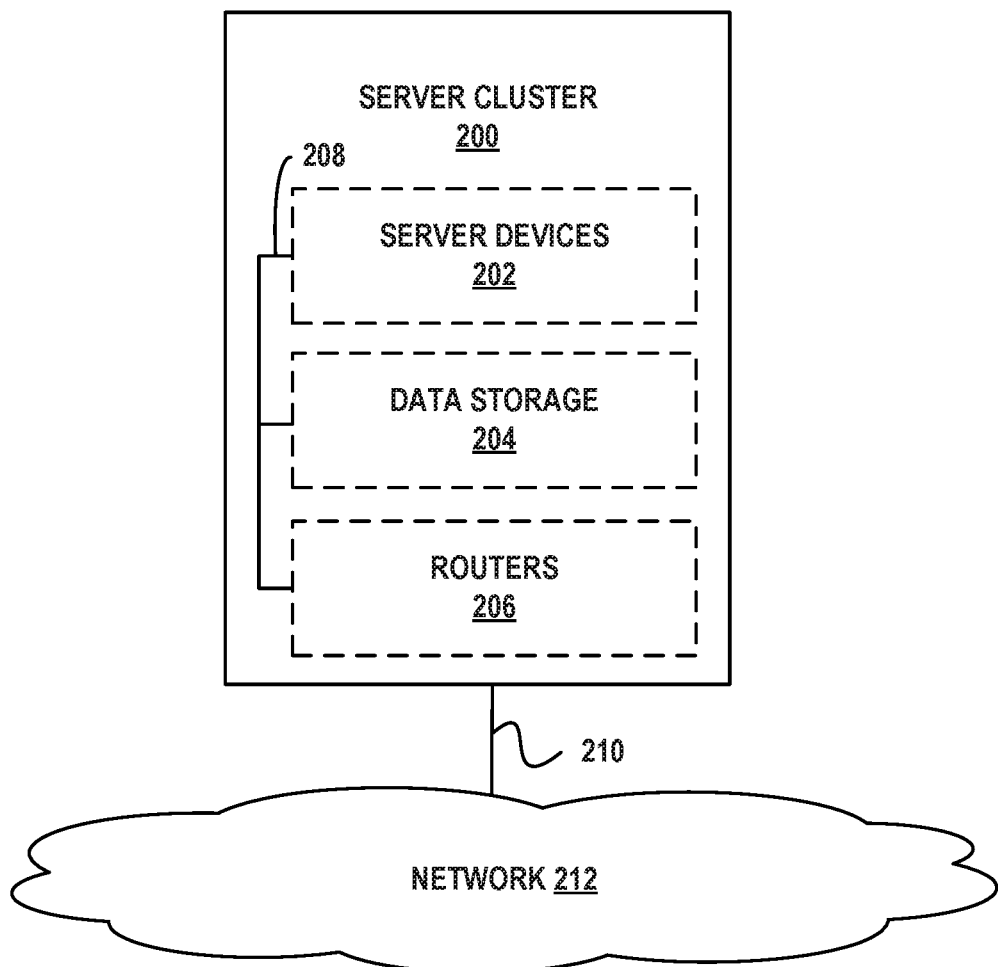
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
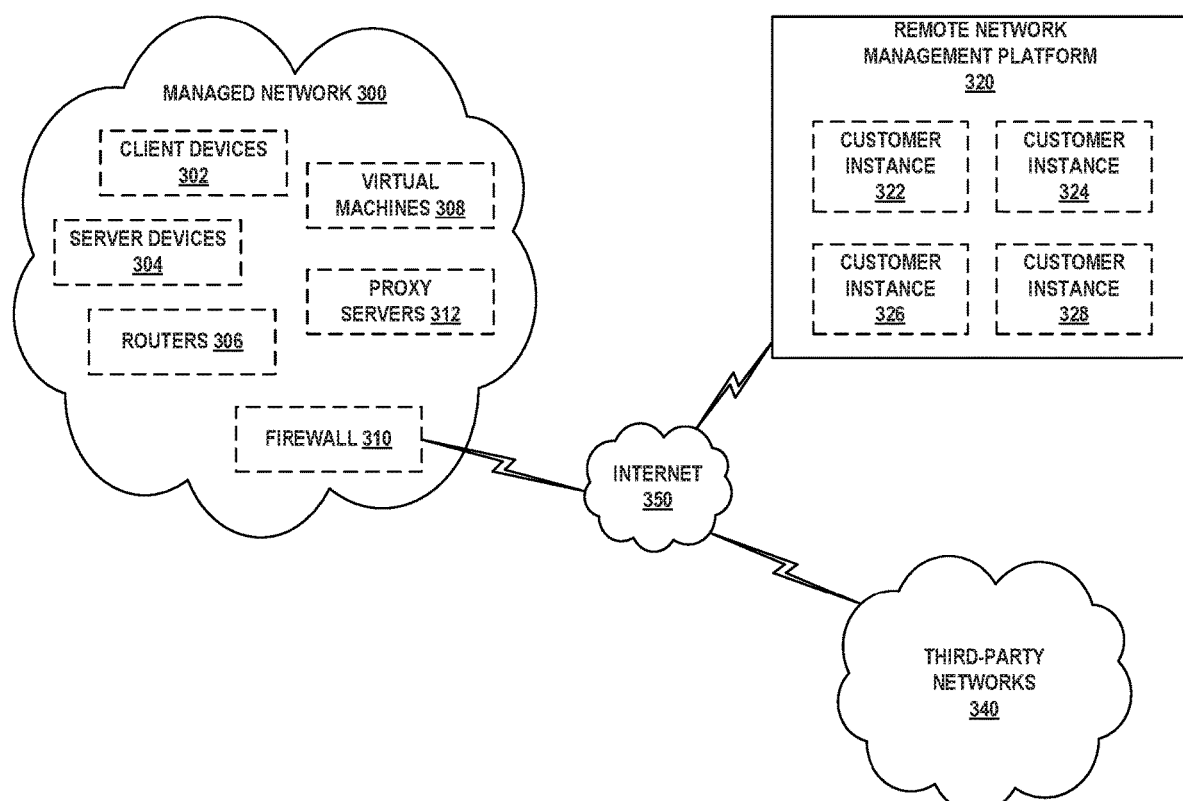
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
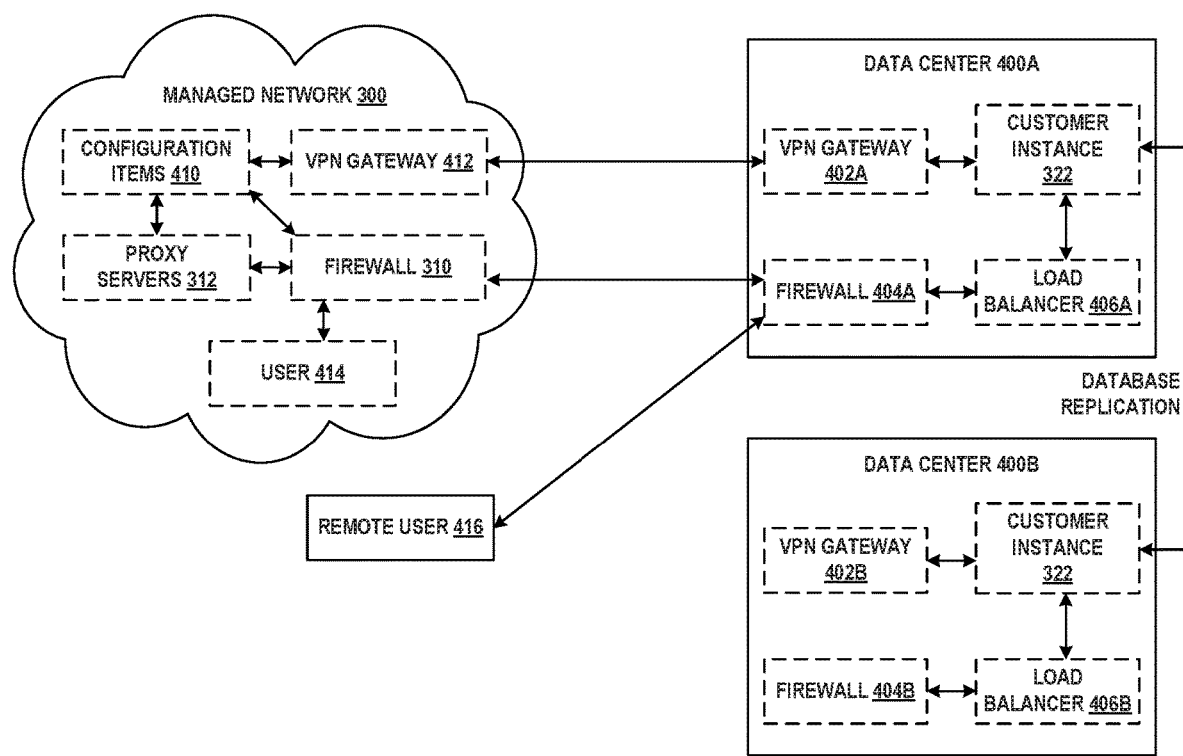
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE AND SERVICE DISCOVERY

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
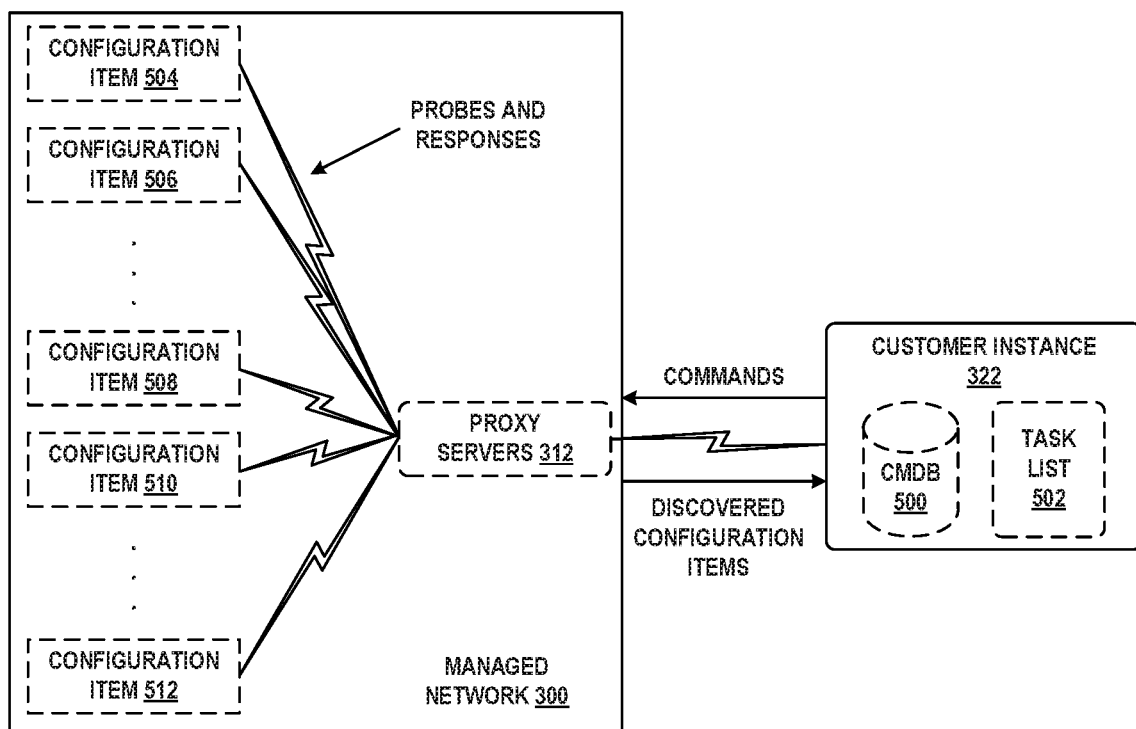
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
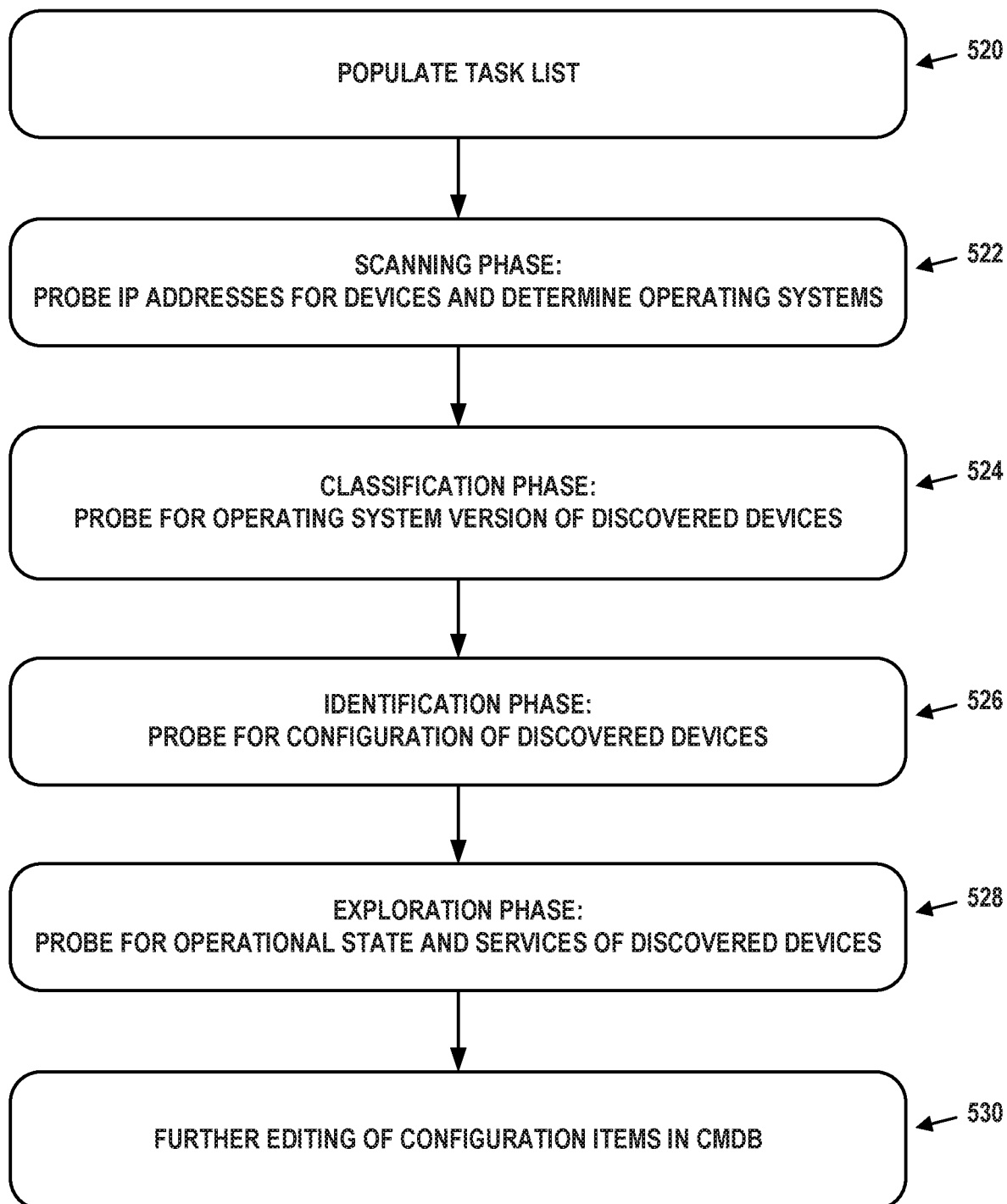
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE CONSUMPTION OF SERVICES MANAGEMENT

Various units in an enterprise (e.g., represented by managed network 300) may include HR, finance, legal, marketing, engineering, supply chain, and IT, among other possibilities. The enterprise network may also include custom units that are specific to the enterprise.

Units in the enterprise may provide services that other units may consume. For instance, HR may provide services that include managing employees of other units, conducting orientations and interviews, and coordinating employees, among other services. These services represent actions toward which members of the HR unit of the enterprise may devote time and resources. As such, other units in the enterprise may use and rely upon the various services provided by HR. For example, legal may use services provided by HR to recruit new attorneys, paralegals, and other new members in the unit. Legal may also rely upon HR to manage employment benefits for members in the unit. Similarly, other units may also consume services provided by HR.

Accordingly, members of HR or another unit of the enterprise (e.g., finance) may desire the ability to ensure that HR is fairly compensated for their services. In addition, members may also want the ability to identify services that need adjustments (e.g., increase or decrease in production) as well as tools that may help predict future demand for HR-related services. Without these abilities and tools, HR might not be fairly compensated for providing their services. Further, HR may also fail to meet future demand expectations for one or more services that members of HR provide.

Other units within the enterprise may encounter similar problems regarding their production and consumption of services. For instance, the supply chain unit of the enterprise may desire the ability to ensure that the supply chain unit is using all the services (e.g., resources) that members of the unit order. Members of the supply chain might lack the tools to monitor the amount and type of services that the supply chain unit receives from various other units in the enterprise.

Similarly, IT may provide computing devices to members of other units in the enterprise. As such, IT might not have the ability to monitor the distribution of the computing devices across the enterprise. Accordingly, IT may desire the ability to ensure that IT is fairly compensated for the computing devices as well as their services provided to set up the computing devices for members for the other units.

As shown, units of an enterprise may benefit from tools that enable members of each unit to manage the production and consumption of services between themselves and other units. For example, a unit that is providing a service may benefit from tools that represent the total cost associated with providing the service over an adjustable period of time. A member of the unit may compare the total cost associated with the providing the service over the time period with the compensation received for the service to ensure that the unit is not losing money or wasting resources.

The unit providing services may also use tools that represent consumption trends of one or more services that the unit provides. In particular, the unit may manage future production of a service based on estimated future demand for the service, which may be based on consumption trends for the service over prior corresponding periods of time. As an example, the legal unit of an enterprise may adjust the number of hours that members of the legal unit expect to devote to contract drafting and review during the next quarter based on the number of hours required to satisfy other units' contract demands during the prior quarter and/or the same quarter of the prior year.

In addition, a unit that is consuming a service may also benefit from tools that help manage the consumption of services. For instance, the unit may use tools to monitor consumption of various services and to further identify any consumption trends that may require adjustments. As an example, a member of the marketing unit may use consumption tools to review the number of facilities that marketing occupied last year and further identify that the marketing team may benefit from the addition of another facility to expand the workspace of the marketing team. In another example, a unit may decide to lower its consumption of one or more services provided by other units within the enterprise. Consumption management tools may help a unit review past consumption of services as well as manage future use of various services.

Further, a unit that assists in facilitating the production and consumption of services between units may also desire consumption management tools that enable review of the various services. For instance, the finance unit of the enterprise may use consumption management tools to ensure that units are fairly compensated for services. The finance unit may also use tools to identify when a service is overproduced or under-produced as well as to make other potential adjustments that may make production and consumption of services within the enterprise more efficient.

Example embodiments describe consumption management tools that may help improve the management and consumption of services across units in an enterprise network. In an example embodiment, a consumption management system may involve a proxy server application disposed within a managed network that includes computing devices and one or more server devices disposed within a remote network management platform. In particular, the remote network management platform may manage the managed network with the server devices configured to obtain information regarding the computing devices by way of the proxy server application.

A server device of the system may receive a request for a graphical representation of consumption trends for a set of services (e.g., one or more services) that are provided and consumed by units of the managed network. The consumption trends for the set of services may be based at least in part on the information regarding the computing devices. Accordingly, the server device may obtain information regarding the consumption trends for the set of services. For instance, the system may gather consumption trend information regarding one or more services using the discovery process depicted in FIG. 5B.

In some cases, a consumption management system may have consumption information available before receiving a request from a client device to access the information. For example, the system may automatically update the information periodically. Alternatively, the system may also update the information continuously or from time to time.

In order to enable members of units to review production and/or consumption information regarding one or more services, the server device may also transmit a representation of a graphical user interface to one or more client devices used by the members of the units. For instance, the server device may transmit a graphical user interface that represents a total price paid for the set of services consumed over a period of time, and respective prices paid for each service of the set of services consumed over the period of time.

In some examples, a consumption management system may enable a user to select and view consumption trends for a specific unit (e.g., HR, legal) or a particular service (e.g., facilities) provided by another unit in the enterprise network. For instance, a user on a client device may provide input that causes the graphical user interface to list and provide details regarding the services consumed by the unit that the user is associated with.

In an example embodiment, a consumption management system may receive a request from a client device that is associated with providing a service. As a result, the consumption management system may provide a graphical representation that includes a total cost associated with providing the service over the period of time, and a graphical chart that compares the consumption trends of the service over the period of time with estimated consumption trends for the service over a subsequent period of time. The estimated consumption trends for the set of services over the subsequent period of time may be based on respective consumption trends for the set of services over one or more prior corresponding periods of time. The user of the client device may review the graphical interface to further understand details regarding providing the service.

In another example embodiment, a consumption management system may receive a request from a client device that is associated with a consumer of a service or set of services provided by another unit in the enterprise network. For instance, the request may come from a client device associated with a particular unit that is consuming a set of services. Accordingly, the system may provide a graphical user interface that represents a description and a particular date of consumption for each service of the set of services. The graphical user interface may also include an input element that enables the user of the client device to dispute a charge for a service that the unit may or may not have received. For instance, the consumer may indicate that the unit consuming a service was overcharged or undercharged for the service. In some cases, the consumer may use the graphical user interface to indicate that the consumer was charged for a service that the consumer did not receive.

In an additional example embodiment, a consumption management system may receive a request from a client device associated with facilitating the production and consumption of one or more services between units of the enterprise network. For instance, a user in the finance unit of the enterprise network may provide a request for a graphical representation that allows the user to view and manage the transactions for various services between two particular units. Accordingly, the system may provide a graphical representation that further represents a total cost associated with providing services over a period of time and a variance associated with the consumption of the services over the period of time for services exchanged between the two units.

The variance may represent a difference between the total cost associated with providing the services and the total price paid for the services.

In other example embodiments, a consumption management system may generate the graphical representation to include information specific to the request from the client device. The graphical representation may enable users to view, manage, and monitor the production and consumption of services between units within the enterprise network.

Figure 6A:
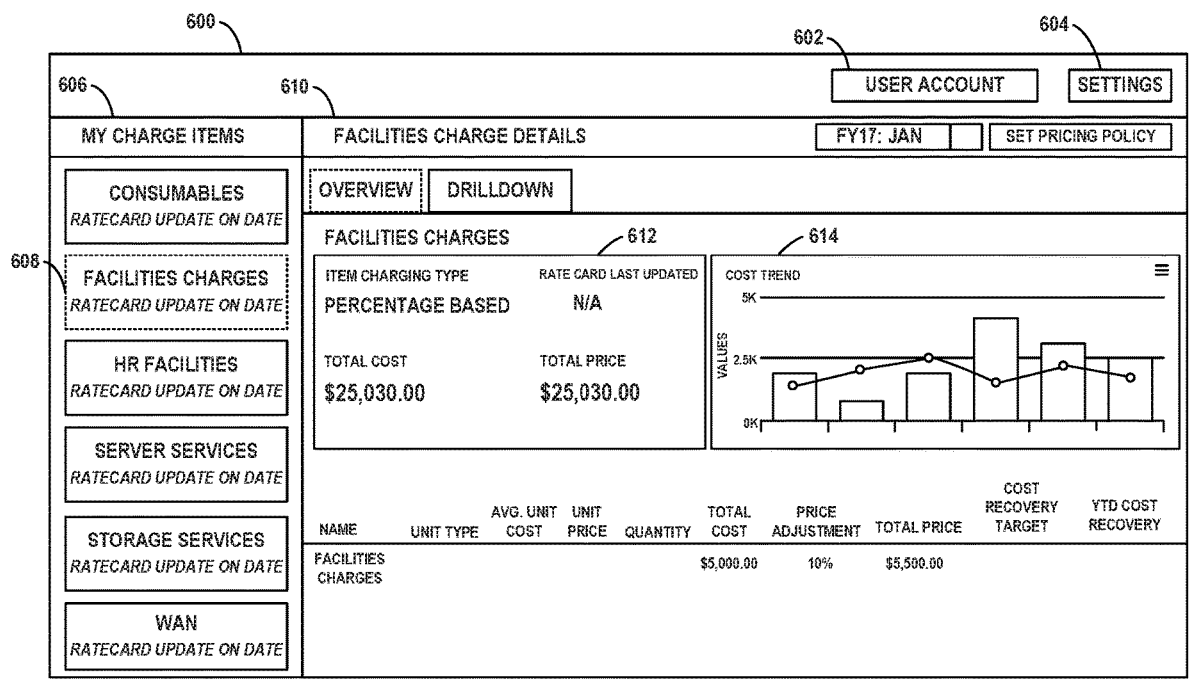
FIG. 6A depicts a graphical user interface representing the consumption of services, in accordance with example embodiments.

FIG. 6A depicts a graphical user interface representing the consumption of services, in accordance with example embodiments. As shown, interface 600 may represent information relating to the consumption of one or more services in a visual, interactive format. An example consumption management system may provide interface 600 to one or multiple entities (e.g., client devices 302) in managed network 300 or remotely accessing interface 600 from another location. For example, the consumption management system may provide interface 600 to a client device in response to receiving a request.

Interface 600 includes various elements, such as user account 602, settings 604, my charge items 606, and charge details 610 configurable to depict consumption information for the item 608 selected in my charge items 606. Although interface 600 is depicted in a particular configuration, interface 600 can have other configurations within examples.

User account 602 represents a portion of interface 600 that may enable a user of a client device to login and store settings 604 associated with interface 600. In some cases, user account 602 may require the user to provide credentials (e.g., a password) to access information depicted within interface 600. After receiving a user login, interface 600 may be configured to restore a user's preferred settings after the user provides credentials via user account 602. In a further example, a server device providing interface 600 may receive login credentials from a user's client device without requiring the user to provide a password or other information.

Similar to user account 602, settings 604 may enable a user to modify the configuration or other elements of interface 600. For instance, settings 604 may enable a user to format and customize the visual representation of interface 600. As an example, a user may use settings 604 to modify colors and fonts used in interface 600.

My charge items 606 represents a portion of interface 600 that may enable a user to select and view information relating to different services in charge details 610. As shown, my charge items 606 includes several services that a user may select to view, including consumables, facilities charges, HR facilities, server services, storage services, and wide area network (WAN) usage. A user may use my charge items 606 to select one of the services to further explore information about that service, including costs and estimated future consumption of the service. In other examples, my charge items 606 may include other options for a user to select.

Charge details 610 represents a portion of interface 600 that depicts information relating the consumption of the service selected by the user in my charge items 606. As shown, charge details 610 is representing an overview of information relating to facilities charges 608 selected in my charge items 606. Accordingly, charge details 610 shows consumption trends of facilities by units within a managed network (e.g., managed network 300). For instance, the consumption trends may convey the cost of the facilities used by units, such as finance, HR, legal, and other units in the enterprise network.

As shown in interface 600, portion 612 of charges details 610 depicts the total cost associated with providing facilities services to units as well as the total price received for the facilities services. Portion 612 of charge details 610 also indicates the item charging type as "percentage based" and further represents when the rate card was last updated.

Charge details 610 also include graphical chart 614 that compares the consumption trends of one or more services (i.e., facilities) over the period of time with estimated consumption trends for the same services over a subsequent period of time. For instance, graphical chart 614 may compare monthly consumption trends by units in managed network 300 with estimated consumption trends for subsequent months.

In another example, graphical chart 614 may compare quarterly consumption trends by units in managed network 300 with estimated consumption trends for subsequent quarters. The estimated consumption trends may be based on prior corresponding periods of consumption. For instance, the estimated consumption trend for a first quarter of the year may be based on the consumption for the service during the first quarter from one or more prior years. Additionally, although graphical chart 614 is shown as a bar and line chart in interface 600, other types of graphical charts or tables may be used to compare consumption trends of a service with estimated future consumption of the service.

Interface 600 further includes table 616 that is configurable to display information relating to the service or services consumed by units of the managed network. For instance, table 616 depicts details relating to the service(s) consumed, such as the name of the service, the unit type, the average unit cost, the unit price, the quantity of the service consumed, the total cost, a price adjustment (if applicable), the total price paid for each service, the cost recovery target, and the year to date (YTD) cost recovery. In another example, table 616 may include more or fewer details. Further, in some instances, table 616 may leave some details empty when the particular category is not applicable to the consumed service.

In some examples, the consumption management system may provide interface 600 to a client device associated with providing the services to units in the enterprise network. As a result, a user of the client device may select different services in charge items 606 to view consumption related information in charge details 610. In particular, the user may view information relating to providing facilities to different units of the enterprise network.

Figure 6B:
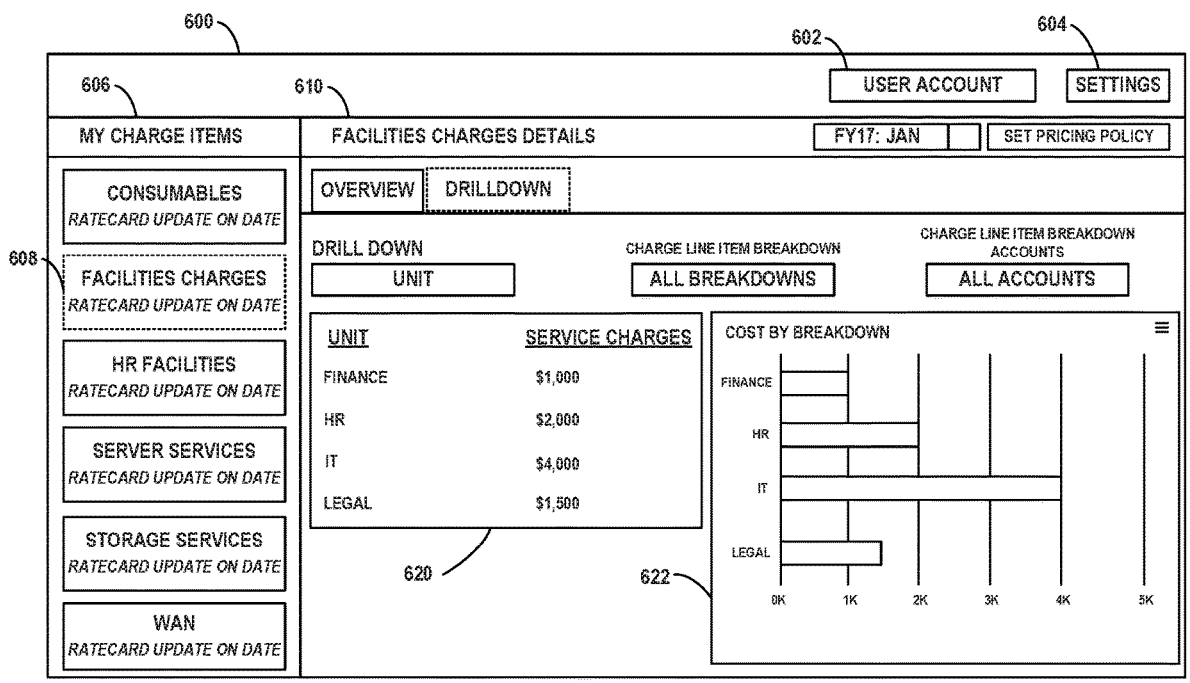
FIG. 6B depicts the graphical user interface of FIG. 6A representing the consumption of services arranged according to units in the managed network, in accordance with example embodiments.

FIG. 6B depicts the graphical user interface of FIG. 6A representing the consumption of services arranged according to units in the managed network, in accordance with example embodiments. A user on a client device may select a drilldown option in charge details 610 of interface 600 to further view the consumption of services arranged according to units in managed network. In particular, the selection of drilldown may cause charge details 610 to include table 620 and graphical chart 622 to view consumption information for units of the managed network, such as finance, HR, IT, and legal.

Table 620 represents the consumption of facilities by the finance unit, the HR unit, the IT unit, and the legal unit of the managed network. In other examples, table 620 may represent include more or fewer business units. For instance, table 620 may include an engineering unit, a manufacturing unit, or a custom unit specific to the managed network. Table 620 further associates a cost of consumption of the service with each unit. For example, table 620 shows that legal provided 1,500 dollars for facilities during the period of time represented in table 620.

In addition to table 620, the drilldown selection also causes charge details 610 to include graphical chart 622 that displays the consumption of the service (i.e., facilities) by each unit. Graphical chart 622 is configured as a bar graph that enables a user to view the consumption of the service by a set of units of the managed network. Accordingly, a user of a client device viewing interface 600 may use either table 620 or graphical chart representation 622 to analyze the consumption of a service by units of the managed network.

Figure 7:
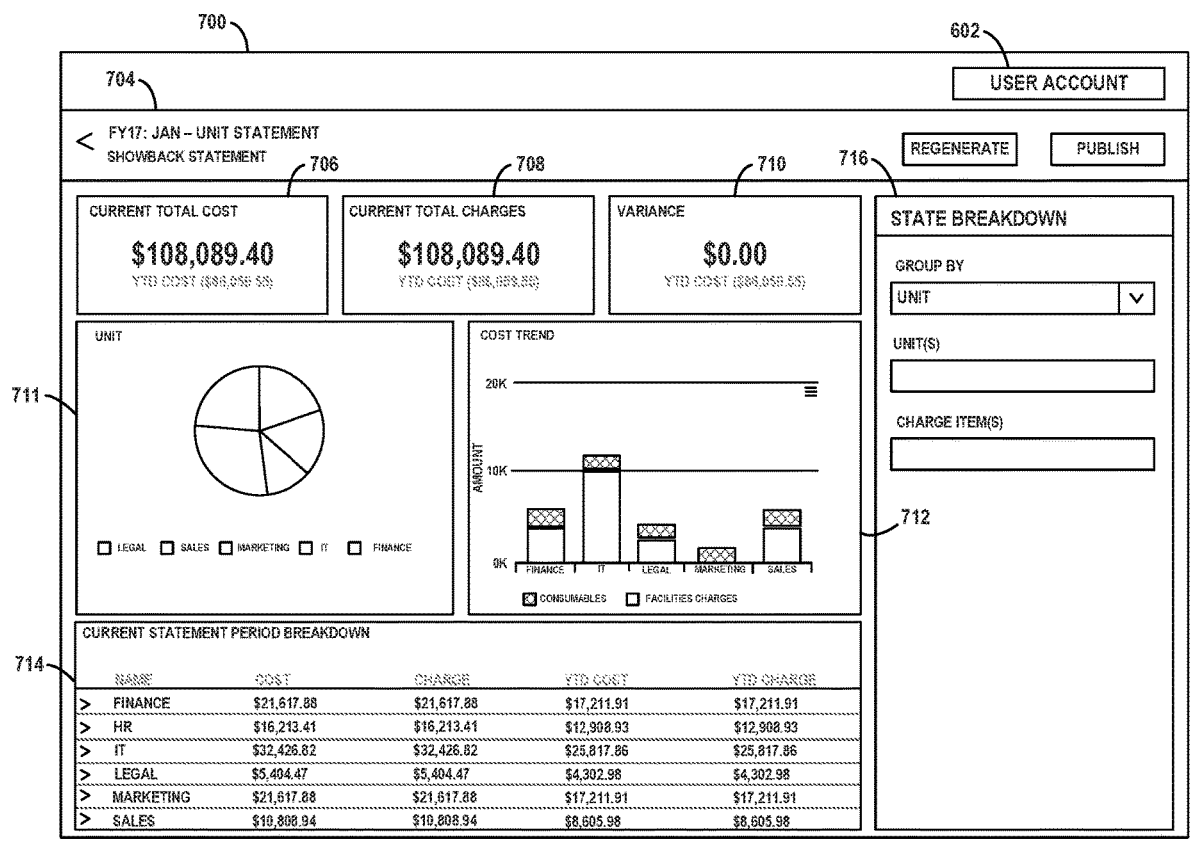
FIG. 7 depicts a graphical interface representing transaction information for consumption of services, in accordance with example embodiments.

FIG. 7 depicts a graphical interface representing transaction information for consumption of services, in accordance with example embodiments. Interface 700 includes user account 602 and unit statement 704, but may include more or fewer elements in other examples.

As shown, unit statement 704 includes current total cost 706, current total charges 708, variance 710, graphical charts 711, 712, current statement period breakdown 714, and state breakdown 716. In other examples, unit statement 704 represent information using more or fewer elements, including elements not shown in FIG. 7. Further, unit statement 704 represents hypothetical financial information for the consumption of services in January 2017. As such, interface 700 may enable a user to view financial information from other periods of time, including different months or other durations of times (e.g., quarters).

Current total cost 706 represents the amount associated with providing a service or multiple services to units in the managed network as well as the year to date (YTD) cost. Current total charges 708 represents the amount charged to units for consumption of the services by the service provider. Variance 710 represents a variance associated with the consumption of the set of services over the period of time. Particularly, variance 710 may be indicative of a difference between the total cost associated with providing the set of services over the period of time and the total price paid for the set of services.

In an example embodiment, a consumption management system may provide interface 700 to a client device associated with facilitating the transaction for the services. In particular, a user of the client device may use interface 700 to ensure that current total cost 706 for the service represented in interface 700 and total current charges 708 for the service are equal. The user of the client device may also confirm that the above values are equal using variance 710.

Graphical chart 711 depicts the consumption of a service by units in the managed work in the form a pie chart. As shown, the consumption of the service by each unit is represented by portions in graphical chart 711. The size of a unit's portion represents an amount of consumption of the service relative to the consumption of that service by other units.

Graphical chart 712 depicts consumption of consumables and facilities charges arranged according to units in the managed network. Consumables may represent services other than the facilities provided to the different units. For example, consumables may represent another service, such as physical goods, equipment, or other resources used by units in the enterprise network.

Statement breakdown 714 represents a table that enables a user to analyze various details regarding the production and consumption of services, such as the cost, charge, year to date (YTD) cost, and YTD charge information. A user may use statement breakdown 714 to further analyze the expenditures and consumption of individual units, such as finance, HR, IT, legal, marketing, and sales. Further, interface 700 includes state breakdown 716 that enables a user to select preferences for table 714 to display. In some example embodiments, a user may input selections to state breakdown 716 to also adjust the information conveyed within graphical charts 711, 712.

FIG. 8 depicts a graphical interface representing statements for consumption of services, in accordance with example embodiments. Interface 800 includes user account 602 and show back statements 804 that further includes show back run logs 806. Interface 800 may include more or fewer elements in other examples.

Show back statements 804 may enable a user on a client device to view the consumption of a unit. For instance, show back statements 804 may enable a user to generate a statement that includes details about consumption trends by a unit during a time period specified by the user. Interface 800 further includes show back run logs 806 that represent a variety of information about the consumption of one or more services by a unit. Particularly, show back run logs 806 may convey statements for various periods of time, such as different months in a year.

In some example embodiments, a consumption management system may provide interface 800 to a client device associated with facilitating the transaction for the services. In particular, a user of the client device may use interface 800 to check past consumption of the services and the amount billed for the consumption.

FIG. 9 depicts a graphical interface representing consumption information for a consumer of a service, in accordance with example embodiments. Interface 900 includes user account 602, settings 604, my charge items 906, consumables selection 908, and consumable details 910.

Consumables selection 908 is shown selected in my charge items 906, which results in consumable details 910 representing information regarding consumables, such as the consumption of various consumables during February 2017. Consumable details 910 further indicate that the information uses a percentage based charging type and a catalog item level charging policy.

In addition, consumable details 910 further includes a table that represents the consumption of tablets, including tablet type 1 and tablet type 2 along with the total cost for each tablet type. The table also includes an option to adjust the price of either tablet. For instance, a user may provide input to increase or decrease future prices charged for an item or items via the price adjustment option.

IV. EXAMPLE OPERATIONS

Figure 10:
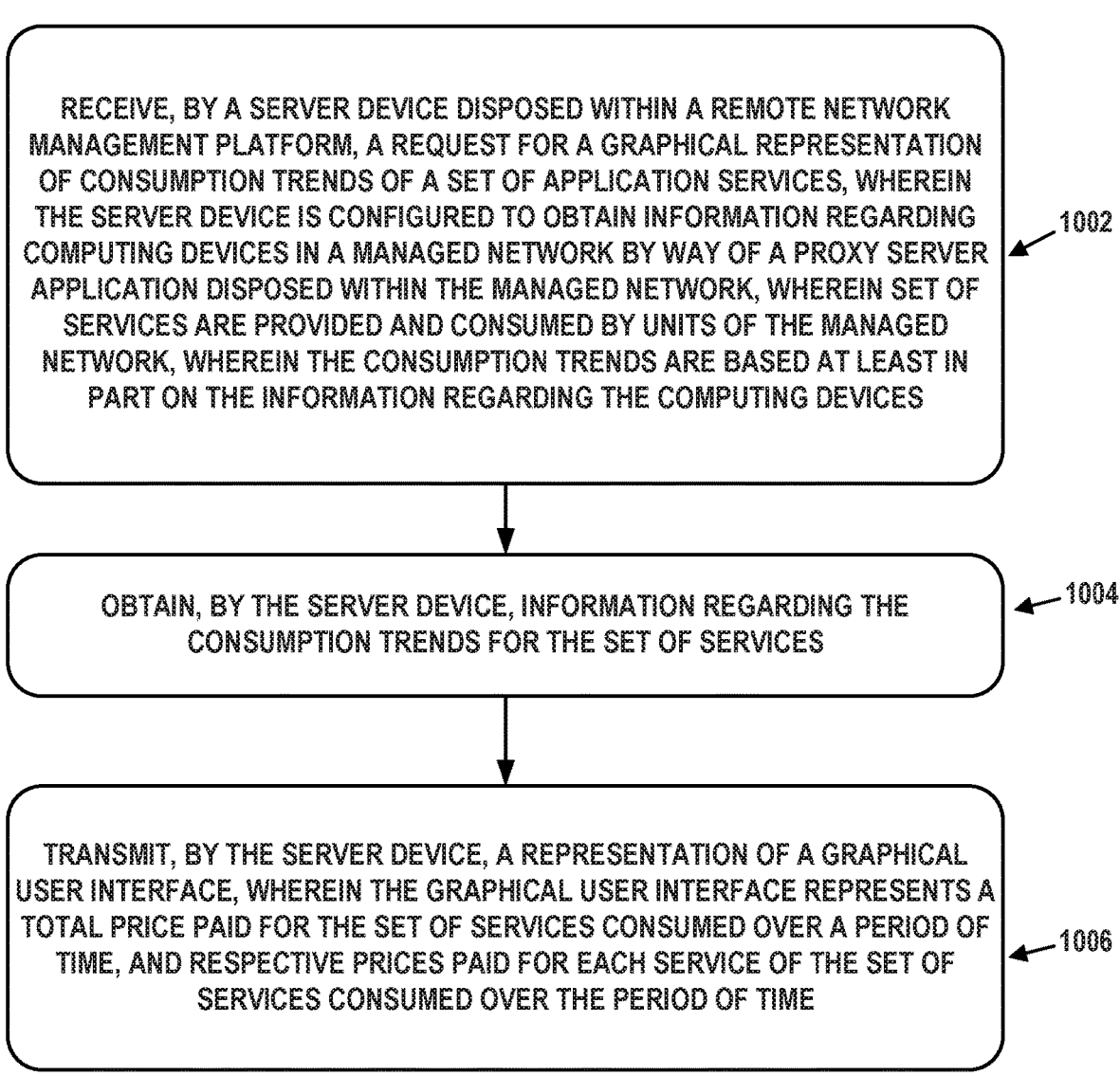
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

A. Receive a Request for a Graphical Representation

Block 1002 may involve receiving, by a server device disposed within a remote network management platform from a client device, a request for a graphical representation of consumption trends of a set of application services. In particular, the server device may be configured to obtain information regarding computing devices in a managed network by way of a proxy server application disposed within the managed network, and the set of services may be provided and consumed by units of the managed network. For example, units of the managed network may include a HR unit, a marketing unit, a legal unit, a finance unit, and custom units, among other possibilities.

In some embodiments, the consumption trends may based at least in part on the information regarding the computing devices. For instance, users associated with a given unit in the managed network may use the computing devices to provide or consume a service or services. Further, the remote network management platform may manage the set of applications and the computing devices.

In an example embodiment, the server device may receive the request from a client device associated with managed network 300. For example, the server device may receive the request from a client device that is associated with a provider of the set of services. The client device may be used by a user that helps a unit (e.g., HR, finance) provide the service(s).

In some cases, the request received at the server device within remote network management platform 320 may specify particular parameters for the graphical representation to provide. For instance, the request may specify a particular service or consuming unit to focus the representation upon. The set of services included within a request may include one or more services in some examples.

B. Obtain Information Regarding the Consumption Trends for Services

Block 1004 may involve obtaining, by the server device, information regarding the consumption trends for the set of services. For instance, the server device or another entity within remote network management platform 320 may obtain information regarding consumption trends for one or multiple services. The information may indicate the amount of consumption of one or multiple services by one or more units in the managed network. As an example, the server device may obtain information that indicates the number of smartphones acquired and used by different units in the managed network. In particular, the information may indicate how many smartphones the provider of the smartphones (e.g., IT) provided to each unit.

The server device may automatically obtain consumption information such that the server device in remote management platform 320 may provide consumption management tools to any authenticated client device. In another example, the server device may obtain the consumption information that was previously stored in remote network management platform 320.

In a further example, the consumption management system may perform the discovery process described in FIG. 5B to obtain information about the consumption of one or more services provided and consumed by units of the managed network. For instance, the system may periodically obtain consumption information relating to all or a subset of services provided or consumed by one or more units, such as HR, legal, marketing, etc.

C. Transmitting a Representation of a Graphical User Interface

Block 1006 may involve transmitting, by the server device, a representation of a graphical user interface. The server device or another entity within remote network management platform 320 may transmit the representation of the graphical user interface to the client device that originally requested the information as well as to other authenticated devices within the enterprise network. For example, the server device may transmit the representation of the graphical user interface via a web-based interface that enables the client device to render the graphical user interface on a display unit.

As an example, the server device may transmit the graphical user interface using Internet 350 to one or multiple client devices 302 or other entities within managed network 300 or elsewhere. In a further example, the server device may periodically update the consumption of services information such that the consumption management tools are available to any authenticated device in the enterprise network to access in real-time.

The graphical user interface may have various configurations within examples. For instance, the graphical user interface may represent a total price paid for the set of services consumed over a period of time, and respective prices paid for each service of the set of services consumed over the period of time. The consumption of services may indicate a variety of information relating to each service, such as a quantity consumed, the consumer of each service (e.g., which unit of the managed network), the date consumed, the price paid for each service, among other information.

In an example embodiment, the original request received by the server device may be from a client device that is associated with a provider of one or more services of the set of services. As a result, the graphical representation may further represent a total cost associated with providing the set of services over the period of time, and a graphical chart that compares the consumption trends of the set of services over the period of time with estimated consumption trends for the set of services over a subsequent period of time.

For instance, the client device may be associated with the supply chain unit of the managed network and may request for information relating to the consumption trends of materials provided by the supply chain unit to other units in the managed network. Accordingly, the graphical representation may indicate a total cost upon the supply chain for providing the materials to other units over a period of time (e.g., the first quarter of the year) and may also include a graphical chart (e.g., bar graph) that compares the consumption trends of the materials over the first quarter of the year with estimated consumption trends for the material over a subsequent period of time (e.g., the first quarter of next year).

In some examples, the estimated consumption trends for the set of services over the subsequent period of time may be based on respective consumption trends for the set of services over one or more prior corresponding periods of time. For example, the consumption management system may estimate consumption trends for future months of the year by units in the managed network based on the consumption of the same service over the same months of one or more prior years by the same units.

The system may also factor other parameters when estimating future consumption of a service. For instance, the system may factor the number of units that will no longer use a service as well as new units that may start using the service when estimating future consumption trends for the service. The system may also factor changes in size of units when estimating the future consumption of a service since the size of each unit (e.g., the number of client devices) may impact the consumption of a service. Similarly, the system may also consider the type of service when estimating future consumption trends since some services may be cyclical and not consumed the same way each year. For instance, the system may predict that a unit that received a new set of computing devices may refrain the next year from receiving the same amount of computing devices since the lifespan of most computing devices may be greater than one year.

The graphical representation may also be further configurable to represent a table and a corresponding graphical chart that both depict the consumption trends of the set of services over the period of time arranged according to individual consumption of respective services by at least some of the units of the managed network. For example, a user of the client device providing the request may select a service within the graphical user interface to receive additional information regarding the service, including the consumption of the service over a period of time and how much each unit of the managed network consumed.

In some example embodiments, the request originally received by the server device may be from a client device associated with a consumer of the set of services. For example, a client device for the engineering unit of the managed network may provide the request for the graphical representation to the server device. When the request is received from a client device associated with a consumer of the services, the graphical representation may be further configurable to represent a description and a particular date of consumption for services of the set of services. For instance, the request may cause the graphical representation to provide information specific to the consumption trends for the associated consuming unit.

In a further example, the graphical representation may also include one or multiple input elements that enable a user of the client device to dispute a charge for a service consumed by an associated unit.

In another example embodiment, the graphical representation may further represent a total cost associated with providing the set of services over the period of time and a variance associated with the consumption of the set of services over the period of time. Particularly, the variance may be indicative of a difference between the total cost associated with providing the set of services over the period of time and the total price paid for the set of services. Additionally, the graphical representation may also be configurable to further represent a table and a corresponding graphical pie chart that both depict the consumption trends of the set of services arranged according to individual consumption of services of the set of services by at least some of the units of the managed network.

In some examples, the graphical representation may further include a search tool that enables selection and subsequent display of information relating to a particular service of the set of services. For instance, a user may use the search tool to narrow down the consumption trend information to a particular service, provider, or consumer.

D. Other Variations and Embodiments

In a further example, a system may include means for providing graphical user interfaces relating to discovering consumption of services. The system may include means for receiving, by a server device disposed within a remote network management platform, a request for a graphical representation of consumption trends of a set of application services. For instance, the server device may be configured to obtain information regarding computing devices in a managed network by way of a proxy server application disposed within the managed network and the set of services may be provided and consumed by units of the managed network. Further, the consumption trends may be based at least in part on the information regarding the computing devices.

The system may also include means for obtaining, by the server device, information regarding the consumption trends, and means for transmitting, by the server device, a representation of a graphical user interface. In some example embodiments, the graphical user interface may represent a total price paid for the set of services consumed over a period of time, and respective prices paid for each service of the set of services consumed over the period of time.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    a processor; and
    a non-transitory, tangible, computer readable medium storing instructions that, when executed by the processor, cause the processor to perform actions comprising:
        receiving, from a client device, a request for a graphical representation of consumption trends for a set of services, wherein the set of services are provided by units of a managed network and consumed by the units of the managed network, wherein a remote network management platform manages the managed network, and wherein the consumption trends are based on information regarding a plurality of computing devices in the managed network associated with the units of the managed network;
        obtaining, via a discovery process, information regarding the consumption trends for the set of services, wherein the discovery process comprises:
            probing, via a proxy server, IP addresses of the computing devices associated with the units of the managed network;
            identifying, via the proxy server, the configuration of operating systems executing on the computing devices associated with the units of the managed network;
            retrieving, via the proxy server, data stored on the plurality of computing devices;
            identifying a first amount of the set of services provided by each of the units of the managed network and a second amount of the set of services consumed by each of the units of the managed network;
        analyzing the data to identify the consumption trends; and
        transmitting, to the client device, a representation of a graphical user interface, wherein the graphical user interface represents a total price paid for the set of services consumed over a period of time, and respective prices paid for each service of the set of services consumed over the period of time.

2. The system of claim 1, wherein the client device is associated with a provider of the set of services, the provider comprising one of the units of the managed network, and
    wherein the graphical representation further represents a total cost associated with providing the set of services over the period of time, and a graphical chart that compares the consumption trends of the set of services over the period of time with estimated consumption trends for the set of services over a subsequent period of time.

3. The system of claim 2, wherein the estimated consumption trends for the set of services over the subsequent period of time is based on respective consumption trends for the set of services over one or more prior corresponding periods of time.

4. The system of claim 2, wherein the graphical representation is further configurable to represent a table and a corresponding graphical chart that both depict the consumption trends of the set of services over the period of time arranged according to individual consumption of respective services by at least some of the units of the managed network.

5. The system of claim 1, wherein the units of the managed network includes a finance unit, a human resources (HR) unit, an information technology (IT) unit, and a legal unit.

6. The system of claim 1, wherein the client device is associated with a consumer of the set of services, the consumer comprising one of the units of the managed network, and
    wherein the graphical representation is further configurable to represent a description and a particular date of consumption for respective services of the set of services.

7. The system of claim 6, wherein the graphical representation is further configurable to represent an input element that enables a dispute of a given charge for a particular service of the set of services consumed by a unit of the managed network.

8. The system of claim 1, wherein the graphical representation further represents a total cost associated with providing the set of services over the period of time and a variance associated with the consumption of the set of services over the period of time, wherein the variance is indicative of a difference between the total cost associated with providing the set of services over the period of time and the total price paid for the set of services.

9. The system of claim 8, wherein the graphical representation is configurable to further represent a table and a corresponding graphical pie chart that both depict the consumption trends of the set of services arranged according to individual consumption of services of the set of services by at least some of the units of the managed network.

10. The system of claim 1, wherein the graphical representation further includes a search tool that enables selection and subsequent display of information relating to a particular service of the set of services.

11. A method comprising:
receiving, from a client device and via a processor, a request for a graphical representation of consumption trends for a set of services, wherein the set of services are provided by units of a managed network and consumed by the units of the managed network, wherein a remote network management platform manages the managed network, and wherein the consumption trends are based on information regarding a plurality of computing devices in the managed network associated with the units of the managed network;
obtaining, via a discovery process, information regarding the consumption trends for the set of services, wherein the discovery process comprises:
probing, via a proxy server, IP addresses of the computing devices associated with the units of the managed network;
identifying, via the proxy server, the configuration of operating systems executing on the computing devices associated with the units of the managed network;
retrieving, via the proxy server, data stored on the plurality of computing devices;
identifying a first amount of the set of services provided by each of the units of the managed network and a second amount of the set of services consumed by each of the units of the managed network;
analyzing the data to identify the consumption trends; and
transmitting, to the client device, a representation of a graphical user interface, wherein the graphical user interface represents a total price paid for the set of services consumed over a period of time, and respective prices paid for each service of the set of services consumed over the period of time.

12. The method of claim 11, wherein the client device is associated with the managed network.

13. The method of claim 12, wherein the client device is associated with a provider of the set of services, the provider comprising one of the units of the managed network, and wherein the graphical representation further represents a total cost associated with providing the set of services over the period of time, and a graphical chart that compares the consumption trends of the set of services over the period of time with estimated consumption trends for the set of services over a subsequent period of time.

14. The method of claim 13, wherein the estimated consumption trends for the set of services over the subsequent period of time is based on respective consumption trends for the set of services over one or more prior corresponding periods of time.

15. The method of claim 13, wherein the graphical representation is further configurable to represent a table and a corresponding graphical chart that both depict the consumption trends of the set of services over the period of time arranged according to individual consumption of respective services by at least some of the units of the managed network.

16. The method of claim 12, wherein the units of the managed network includes a finance unit, a human resources (HR) unit, an information technology (IT) unit, and a legal unit.

17. The method of claim 13, wherein the client device is associated with a consumer of the set of services, the consumer comprising one of the units of the managed network, and
wherein the graphical representation is further configurable to represent a description and a particular date of consumption for respective services of the set of services.

18. The method of claim 17, wherein the graphical representation is further configurable to represent an input element that enables a dispute of a given charge for a particular service of the set of services consumed by a unit of the managed network.

19. An article of manufacture including a non-transitory computer-readable medium having cored thereon program instructions that, upon execution by a processor, cause the processor to perform operations comprising:
receiving, from a client device and via a processor, a request for a graphical representation of consumption trends for a set of services, wherein the set of services are provided by units of a managed network and consumed by the units of the managed network, wherein a remote network management platform manages the managed network, and wherein the consumption trends are based on information regarding a plurality of computing devices in the managed network associated with the units of the managed network;
obtaining, via a discovery process, information regarding the consumption trends for the set of services, wherein the discovery process comprises:
probing, via a proxy server, IP addresses of the computing devices associated with the units of the managed network;
identifying, via the proxy server, the configuration of operating systems executing on the computing devices associated with the units of the managed network;
retrieving, via the proxy server, data stored on the plurality of computing devices;
identifying a first amount of the set of services provided by each of the units of the managed network and a second amount of the set of services consumed by each of the units of the managed network;
analyzing the data to identify the consumption trends; and
transmitting, to the client device, a representation of a graphical user interface, wherein the graphical user interface represents a total price paid for the set of services consumed over a period of time, and respective prices paid for each service of the set of services consumed over the period of time.

20. The article of manufacture of claim 19, wherein the graphical representation further represents a total cost associated with providing the set of services over the period of time and a variance associated with the consumption of the set of services over the period of time, wherein the variance is indicative of a difference between the total cost associated with providing the set of services over the period of time and the total price paid for the set of services.

* * * * *